United States Patent [19]

Guarga Ferro

[11] Patent Number: 5,647,165

[45] Date of Patent: Jul. 15, 1997

[54] SELECTIVE INVERTED DRAIN

[76] Inventor: Rafael Guarga Ferro, P.O. Box 6124, Montevideo 11000, Uruguay

[21] Appl. No.: 903,601

[22] Filed: Jun. 24, 1992

[30] Foreign Application Priority Data

Jun. 25, 1991 [UY] Uruguay ................................ 23246

[51] Int. Cl.$^6$ .................................................. A01G 13/00
[52] U.S. Cl. ............................... 47/2; 405/52; 405/303
[58] Field of Search ........................... 405/52, 22, 303; 47/2 R; 239/77, 78; 417/364; 415/126

[56] References Cited

U.S. PATENT DOCUMENTS

| | | | |
|---|---|---|---|
| 1,398,927 | 11/1921 | Whitlock | 47/2 |
| 1,833,277 | 11/1931 | Cummings | 47/2 X |
| 2,641,085 | 6/1953 | Robinson et al. | 47/2 |
| 2,815,982 | 12/1957 | Bleamaster | 47/2 X |
| 3,003,282 | 10/1961 | Davies | 47/2 |
| 3,055,145 | 9/1962 | Lindsay | 47/2 |
| 3,148,509 | 9/1964 | Laurie | 405/22 |
| 3,243,890 | 4/1966 | Easterday | 47/2 X |
| 3,292,306 | 12/1966 | Carlson | 47/2 |
| 3,969,842 | 7/1976 | Velie | 47/2 |

FOREIGN PATENT DOCUMENTS

| | | | |
|---|---|---|---|
| 746669 | 11/1966 | Canada | 405/22 |
| 599859 | 11/1959 | Italy | 47/2 |

OTHER PUBLICATIONS

Spigel, R. H. and Farrant, B., "Selecrtive Withdrawal Through a Point Sink and Pycnocline Formation in a Linearly Stratified Flow", Journal of Hydraulic Research, vol. 22, 1984 Title page, table of contents, and pp. 34–51.

Davies, T.D., et al, "Development and Testing of a Two-Dimensional Downslope Wind Model", *Boundary-Layer Meteorology* 73: 279–297, 1995. pp. 279–297.

Fleagle, Robert G., and Businger, Joost A., *An Introduction to Atmospheric Physics*, Academic Press, 1980. pp. 292–295.

Turrell, F.M., "The Science and Technology of Frost Protection", *The Citrus Industry*, Chapter 10, 1972, p. 338, and pp. 425–426.

*Primary Examiner*—Dennis L. Taylor
*Attorney, Agent, or Firm*—Ladas & Parry

[57] ABSTRACT

A selective inverted drain has an upright cylindrical duct the base whereof may flare out in trumpet or funnel shape and fixed or adjustable legs. An atmospheric fluid dynamizing device is in the portion between the lower half of the upright cylindrical duct and the flared out portion thereof.

7 Claims, 5 Drawing Sheets

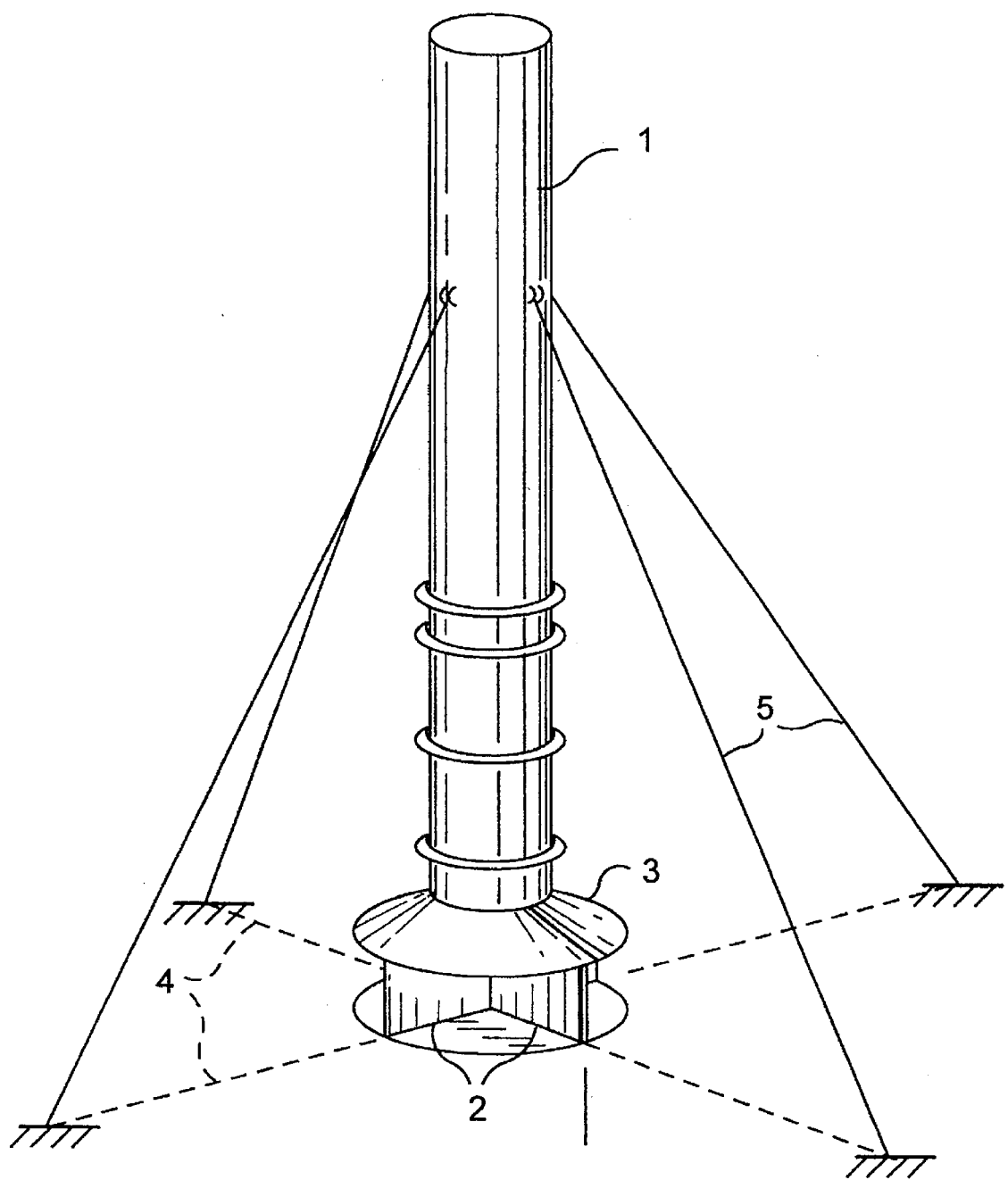
F I G. 1

SELECTIVE INVERTED DRAIN

The patent application refers to a selective inverted drain intended to prevent the negative effect of frost on agricultural crops.

The damage to crops and, thus, to farmers owing to the phenomenon called frost is well known. The frost kills different types of plants generally intended to market, either in themselves, or the fruit thereof.

The death of such plants is caused by the low temperature to which they are subjected, particularly in their lower portions, when the phenomenon known as frost occurs.

Frost is a meteorological phenomenon which occurs under very special conditions, a clear sky and an absence of wind, where a marked stratification of the atmosphere is produced by density layers, the colder layers remaining below and affecting crops, particularly crops in lower areas.

Attempts have been made to fight frost by warming crops by means of heaters or seeking to break up stratification by means of fans.

Thus farmers often resort to large bonfires, and in more sophisticated instances, to industrial heaters, to large horizontal-axis fans or to helicopters flying low over the crops.

In the former instance, warming up a certain area seeks to restore the lost heat, and in the latter case, the attempt is to eliminate frost by forced ventilation.

Such systems have shown serious disadvantages. As regards bonfires, the disadvantage is their poor effectiveness, and as regards the other means the main disadvantage is the excessive cost per hectare in order to ensure crop protection.

The object of the present application is an inverted drain which selectively extracts the lower layers of the atmosphere, causing the descent of layers at non-critical temperatures, with a performance per hectare unexpectedly higher than that of the other known means.

The inverted drain consists in a straight cylindrical duct, the lower part of which may flare out in trumpet or funnel shape and be provided with legs or support elements so that its lower rim remains at a suitable distance from the soil. The distance between the lower rim and the soil is what gives the inverted drain its selective character, since the layer or layers of thermal air strata that will be extracted depends on the position thereof. Inside, the lower portion of the cylinder is provided with an atmospheric fluid dynamizing element, which may consist in a fan, a heater, or a combination of both, with the sole function of producing an ascending movement of the atmospheric fluid inside the duct. The interior of the duct may in turn be provided with a plurality of vanes or blades to impart a certain direction to the atmospheric fluid in accordance with the laws governing the mechanics of fluids, so that the mass coming out of the top part of the duct may also contribute to improving the mixing of the layers of frost-producing thermal air stratification, thus preventing the critical temperatures which are lethal to crops.

In order to make for a better understanding of the object of this disclosure, drawings are enclosed wherein:

FIG. 1 is a front/top/left side perspective view of one embodiment;

As shown in FIGS. 1 to 4, the invention has a cylindrical duct 1 with legs or support elements 2 at one end to form a lower part or base that supports the duct 1 upright with a lowermost rim 3 of the duct above the ground 4 (which is illustrated as base lines in FIG. 1). In the embodiments shown in the Figures, the lower rim 3 of the duct is enlarged into a trumpet or funnel shape. Stays 5 may help support the duct 1 upright.

Figure 2:
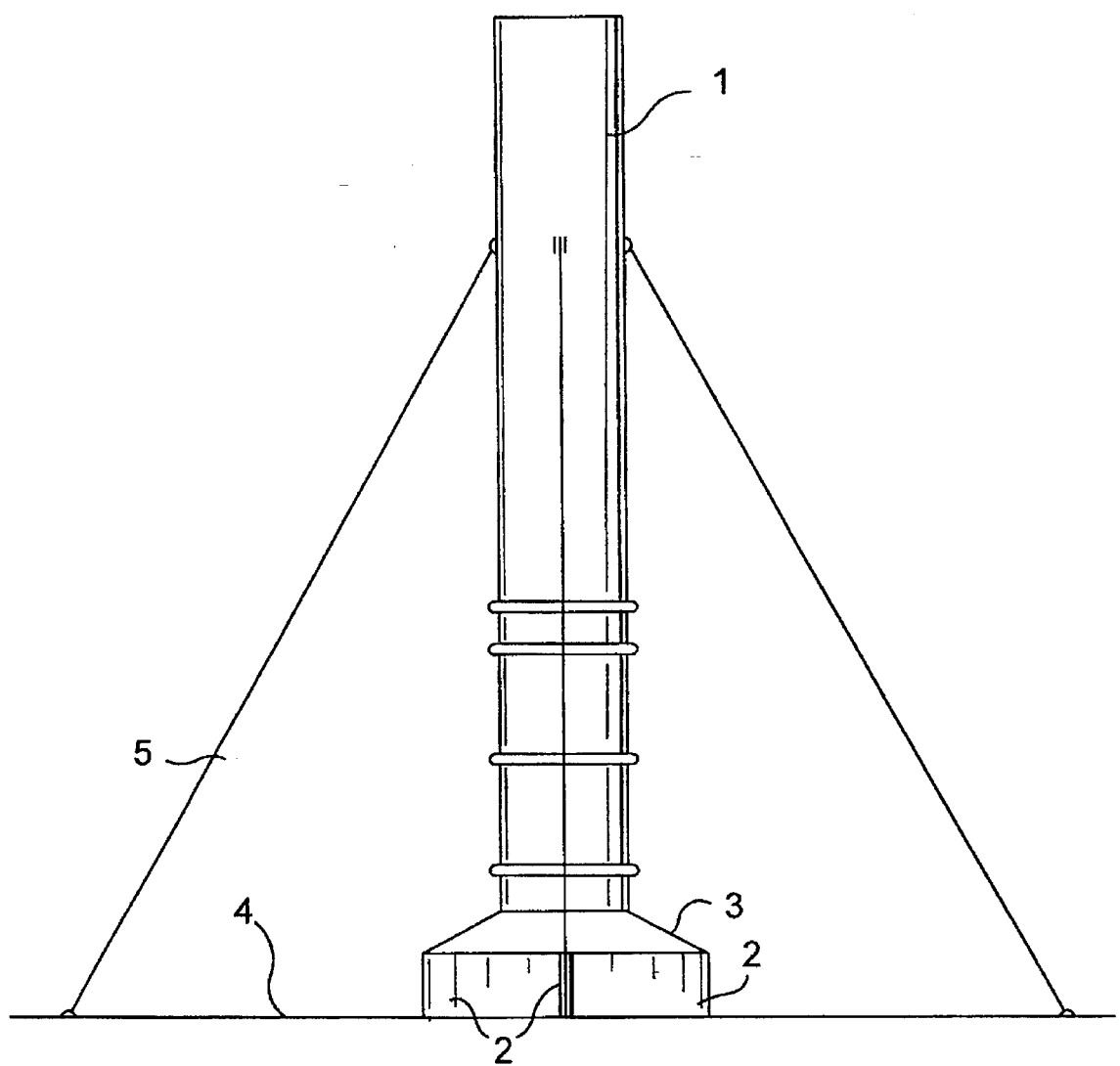
FIG. 2 is a front elevation thereof.
Figure 3:
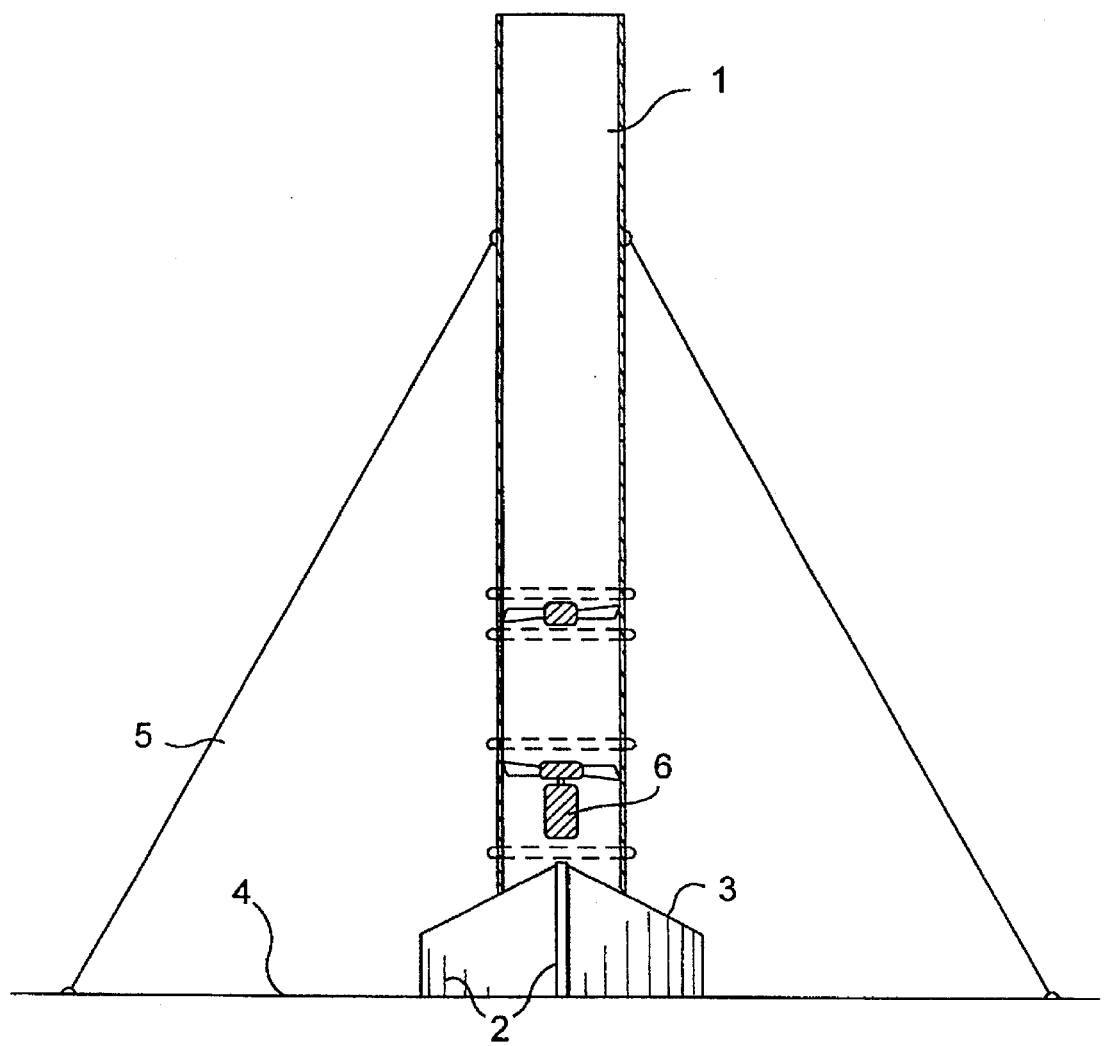
FIG. 3 is a cross-section thereof.
Figure 4:
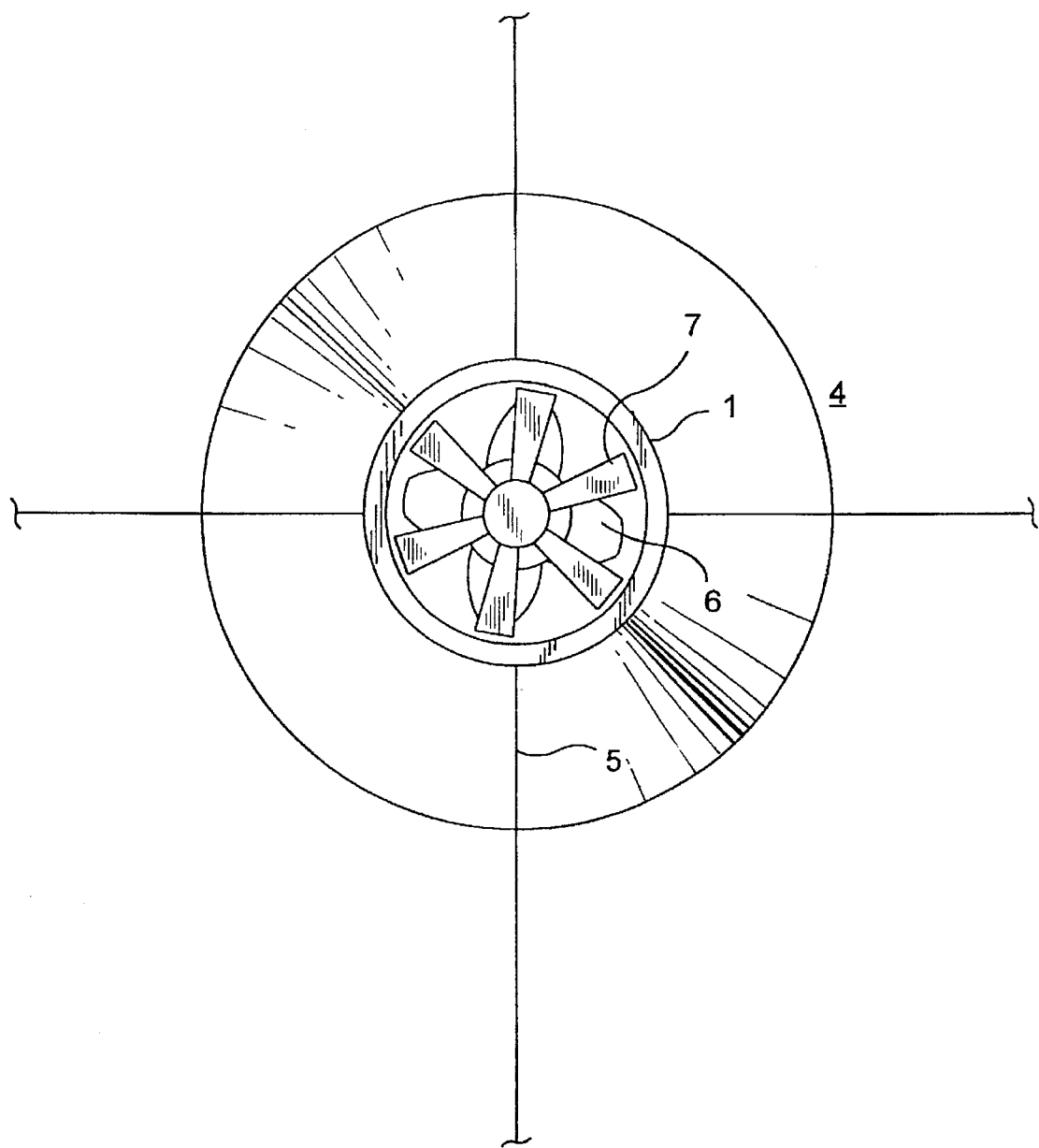
FIG. 4 is a plan view thereof.

FIG. 3 shows a duct-axial fan 6 in a lower portion of the duct 1 to blow air upwardly out the duct past air directing blades or vanes 7 in the duct above the fan.

Figure 5:
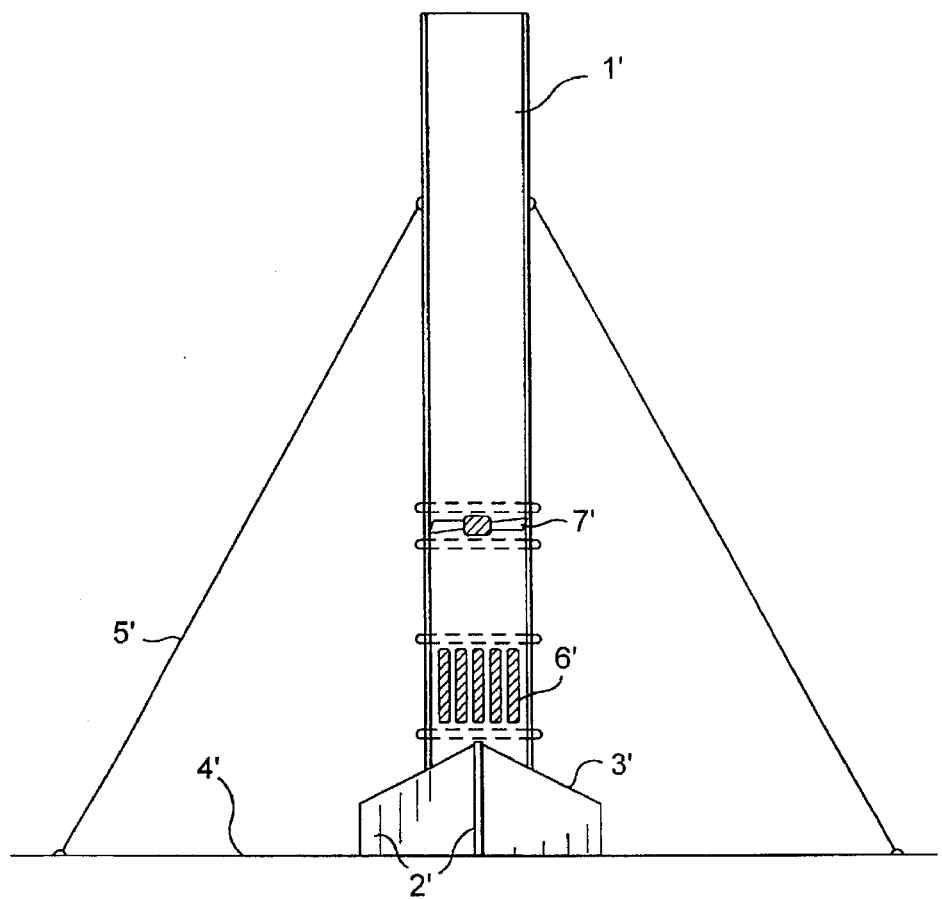
FIG. 5 is a cross-section of another embodiment.

FIG. 5 shows another embodiment, in which a heater 6' has replaced the fan. The elements of FIG. 5 also correspond to those of the preceding Figures and are designated with the same reference characters, but with primes, and not further described.

Figure 6:
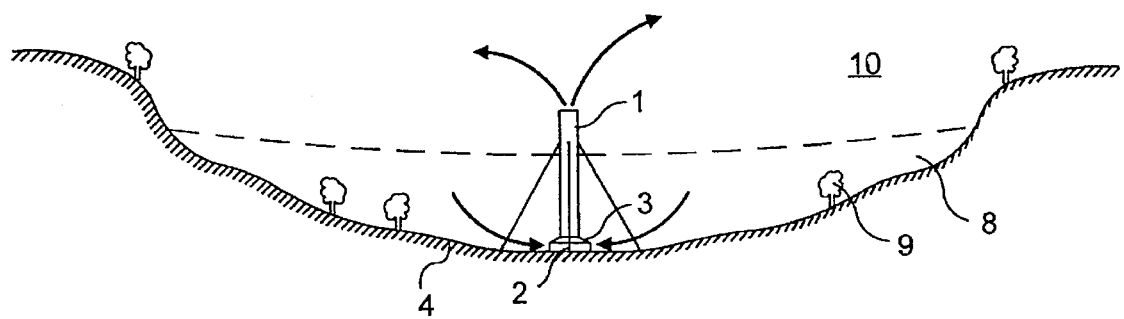
FIG. 6 is a schematic elevation of operation.

FIG. 6 shows with a dashed line a lower, colder, frost producing thermal air strata 8 that will harm crops 9 with a warmer air strata 10 thereabove. The fan 6 (FIG. 3) draws the colder air of strata 8 into the duct 1 at its lower rim 3 that is supported above the ground 4 on the legs 2 and the duct discharges this air from its top, whereby to replace between stratum 8 and with warmer stratum 10 and, thus, the frost colder strata 8 otherwise would produce.

I claim:

1. A selective inverted drain for preventing damage to a crop from a frost-producing thermal stratification of atmosphere wherein the crop is exposed to at least one stratum of air at a critical temperature sufficiently cold to damage the crop, said stratum being present in the thermal stratification below warmer strata containing air at non-critical temperatures not sufficiently cold to damage the crop, said drain comprising:

a vertical duct said vertical duct comprising rim means, including a rim at a lowermost part of the duct, for defining an opening in the bottom of the duct for entry of air such that air drawn into the duct by dynamizing means in the duct passes below the rim and enters the duct through the opening;

support means on the lower end of the duct for supporting the duct upright on the ground with the lowermost rim of the duct spaced above the ground a distance sufficient to allow selective drainage of the air stratum at the critical temperature for the crop whereby the selective drainage of said stratum will cause descent of the warmer air strata without breaking up the thermal stratification of the atmosphere; and atmospheric fluid regulating means consisting of dynamizing means in a lower portion of the upright duct solely for drawing the said stratum of air upwards through the duct, towards the higher and warmer strata.

2. The selective inverted drain according to claim 1, wherein the lowermost rim of the duct flares outwardly from the duct.

3. The selective inverted drain according to claim 1, wherein the dynamizing means is a vertical axis fan.

4. The selective inverted drain according to claim 2, wherein the dynamizing means is a vertical-axis fan.

5. A selective inverted drain for preventing damage to a crop from a frost-producing thermal stratification of atmosphere wherein the crop is exposed to at least one stratum of air at a critical temperature sufficiently cold to damage the crop, said stratum being present in the thermal stratification below warmer strata containing air at non-critical temperatures not sufficiently cold to damage the crop, said drain comprising:

a vertical duct said vertical duct comprising rim means, including a rim at a lowermost part of the duct, for defining an opening in the bottom of the duct for entry of air such that air drawn into the duct by dynamizing means in the duct passes below the rim and enters the duct through the opening;

support means on the lower end of the duct for supporting the duct upright on the ground with the lowermost rim of the duct spaced above the ground a distance sufficient to allow selective drainage of the air stratum at the critical temperature for the crop whereby the selective drainage of said stratum will cause descent of the warmer air strata without breaking up the thermal stratification of the atmosphere; and atmospheric fluid regulating means consisting of dynamizing means in a lower portion of the upright duct solely for drawing the said stratum of air upwards through the duct towards the higher and warmer strata and vanes or blades for imparting directional movement to ascending air that improves a mixture of the ascending air coming out of the top of the duct with air in the warmer strata.

6. The selective inverted drain according to claim 5, wherein the lowermost rim of the duct flares outwardly from the duct.

7. The selective inverted drain according to claim 5, wherein the dynamizing means is a vertical-axis fan.

* * * * *